United States Patent [19]

Krumpe et al.

[11] Patent Number: 4,757,891
[45] Date of Patent: Jul. 19, 1988

[54] CONTAINER HANDLING DEVICE

[75] Inventors: Karen E. Krumpe, Sarver; Leon E. Thompson, Slippery Rock, both of Pa.

[73] Assignee: American Glass Research, Inc., Butler, Pa.

[21] Appl. No.: 5,025

[22] Filed: Jan. 20, 1987

[51] Int. Cl.⁴ .............................................. B65G 47/00
[52] U.S. Cl. ............................... 198/346.2; 198/481.1; 209/903
[58] Field of Search ................ 198/346.2, 480.1, 481.1; 209/539, 918, 919, 526, 701, 903

[56] References Cited

U.S. PATENT DOCUMENTS

| | | | |
|---|---|---|---|
| 1,957,534 | 6/1934 | Gladfelter | 198/480.1 |
| 3,133,638 | 6/1960 | Calhoun | 209/643 X |
| 3,150,758 | 7/1962 | Johnson | 198/480.1 |
| 4,173,274 | 11/1979 | Kantarian et al. | 198/367 |
| 4,378,665 | 4/1983 | Crankshaw et al. | 198/346.2 X |

Primary Examiner—Robert J. Spar
Assistant Examiner—Jennifer Doyle
Attorney, Agent, or Firm—Buchanan Ingersoll

[57] ABSTRACT

A rotating, vertically adjustable wheel is positioned above a linear conveyor chain in an operative position to move containers from a linear conveyor chain to an off-line station and then back to the linear conveyor chain downstream of the off-line station. The rotating wheel is movable to an inoperative position away from the linear conveyor chain when it is not desired to divert the containers from the linear conveyor chain. A base plate positioned adjacent to the linear conveyor chain adjustably supports flexible support bands in spaced relation to the peripheral face of the center of the rotating wheel. The bands are biased toward the rotating wheel so that when a container moving in a linear conveyor chain contacts the face of the rotating wheel, it is engaged by the edge of the wheel and the bands and is moved to the off-line station. The flexible support bands are adjustably positioned to accommodate various sizes and shapes of containers so as to preclude change of parts and downtime. In this manner containers may enter the off-line station at any time regardless of the spacing between bottles in the linear conveyor chain.

19 Claims, 3 Drawing Sheets

CONTAINER HANDLING DEVICE

BACKGROUND OF THE INVENTION

1. Field of the Invention

This invention relates to apparatus and a method for handling containers moving along a linear conveyor line so that the containers may be diverted from the conveyor line to an off-line station adjacent to the conveyor line. The handling device is conveniently mounted to move into and out of position to permit the containers to continue to move on-line or to be diverted off-line and then returned on-line.

2. Description of the Prior Art

In the manufacturing of bottles, cans, or other types of containers, it is common to transport the containers from one manufacturing position to another by means of conveyors which move horizontally in a straight line between the positions. During the manufacturing process and during the filling of the containers, it is often necessary or desirable to divert the containers from the linear conveyor to an off-line station for inspection of the container or its contents. After the container passes through the off-line station, it is desirable to return it to the linear conveyor downstream from the off-line station so that the container may continue along the conveyor to the next manufacturing or filling position.

In the manufacturing of bottles, for example, it is often desirable to photoelectrically scan the bottles for defects at an off-line station adjacent to the conveyor upon which the bottles are moving. Many prior attempts have been made to satisfactorily provide an apparatus that removes a container from a moving linear conveyor, passes it through an off-line station, and returns it to the moving linear conveyor at a point downstream from the off-line station.

An example of such an earlier device is shown in U.S. Pat. No. 3,150,758 wherein a starwheel or turret member is utilized to remove bottles from a conveyor. The starwheel is periodically rotated by means of a Geneva-type drive assembly. Flexible retainer bands are provided around the starwheel to retain bottles within the recesses in the starwheel as the starwheel rotates.

Other devices for moving containers through the use of starwheels or indented turrets are shown in U.S. Pat. No. 1,132,172; U.S. Pat. No. 1,828,324; U.S. Pat. No. 4,230,219; U.S. Pat. No. 1,594,465; U.S. Pat. No. 1,825,751; U.S. Pat. No. 1,844,869; and U.S. Pat. No. 3,717,236.

The use of a starwheel or an indented turret presents some difficulties in synchronizing moving bottles or other containers into the correct position to be captured by the starwheel pockets from a moving linear conveyor. The rotation of the starwheel must be synchronized with the linear speed of the bottles or containers on the conveyor and with the spacing between the bottles in order to precisely receive the bottles within the recesses of the starwheel. This high degree of precision is difficult to maintain. Additional problems are encountered with a starwheel to accommodate a change in container size or shape. For a job change of this type to be executed extensive parts changes are required resulting in substantial downtime. For each container size, a corresponding starwheel must be assembled in the conveyor line.

There is a need for an off-line container handling device capable of receiving containers moving in a linear path without regard to the speed or spacing between containers, additional mechanical parts to match the size of the bottles, and interruption in the conveyance of the containers.

SUMMARY OF THE INVENTION

In accordance with the present invention there is provided a container handling device for controlling the movement of individual containers from a linear conveyor to an off-line station and thereafter returning the containers to the conveyor or bypassing the off-line station without interrupting the linear conveyance of the containers. The device includes a baseplate affixed to the frame carrying the linear conveyor and positioned so that the top of the baseplate is substantially coplaner with the top of the conveyor and positioned over the off-line station. A rotating wheel is positioned above the conveyor and the baseplate so that containers moving along the conveyor come into contact with the peripheral face of the wheel. Flexible retaining means is positioned in spaced relation to the rotating wheel so that containers moving along the conveyor are frictionally engaged between the peripheral face of the wheel and the flexible retaining means to move the containers off the conveyor and onto the baseplate and thereafter back onto the conveyor as the wheel rotates.

Further, in accordance with the present invention, there is provided a motor support structure pivotal between an operative position and an inoperative position. The motor support structure in the operative position extends across an in-line conveyor to divert containers from the conveyor across a baseplate and back to the conveyor. The motor support structure in the inoperative position is pivoted away from the conveyor to permit bottles to continue untouched down the conveyor line. A vertical shaft is supported in the motor support structure. A wheel is mounted on the vertical shaft and is driven by the motor. The wheel is adjustably positioned on the shaft so that the vertical distance between the center of the wheel and the top of the conveyor may be changed in accordance with the size and shape of the containers being carried on the conveyor. Spring loaded plunger units are adjustably secured to the baseplate. Two sections of flexible tubing are supported by the spring loaded plunger units. The plunger units are adjustable horizontally and vertically relative to the baseplate to permit the flexible tubing to be selectively positioned relative to the wheel. Containers move down the conveyor and are frictionally engaged between the wheel and tubing. The containers are driven by the rotating wheel across the baseplate and are returned to the conveyor.

Accordingly, the principal object of the present invention is to provide a container handling device which directs containers from a linear conveyor line to an off-line station and thereafter returns them to the linear conveyor line.

Another object of the present invention is to provide a container handling device wherein a horizontally rotating wheel is utilized to selectively move containers asynchronously at any desired time from a linear conveyor path to an arcuate conveyor path regardless of the spacing between containers.

An additional object of the present invention is to provide a fully adjustable container handling device which may be utilized for containers of different sizes and shapes, thus eliminating the need to change mechanical parts to match the size of the containers and reduce downtime.

These and other objects of the present invention will become apparent as this invention is completely disclosed and described in the following specification, the accompanying drawings and the appended claims.

DESCRIPTION OF THE PREFERRED EMBODIMENT

Figure 1:
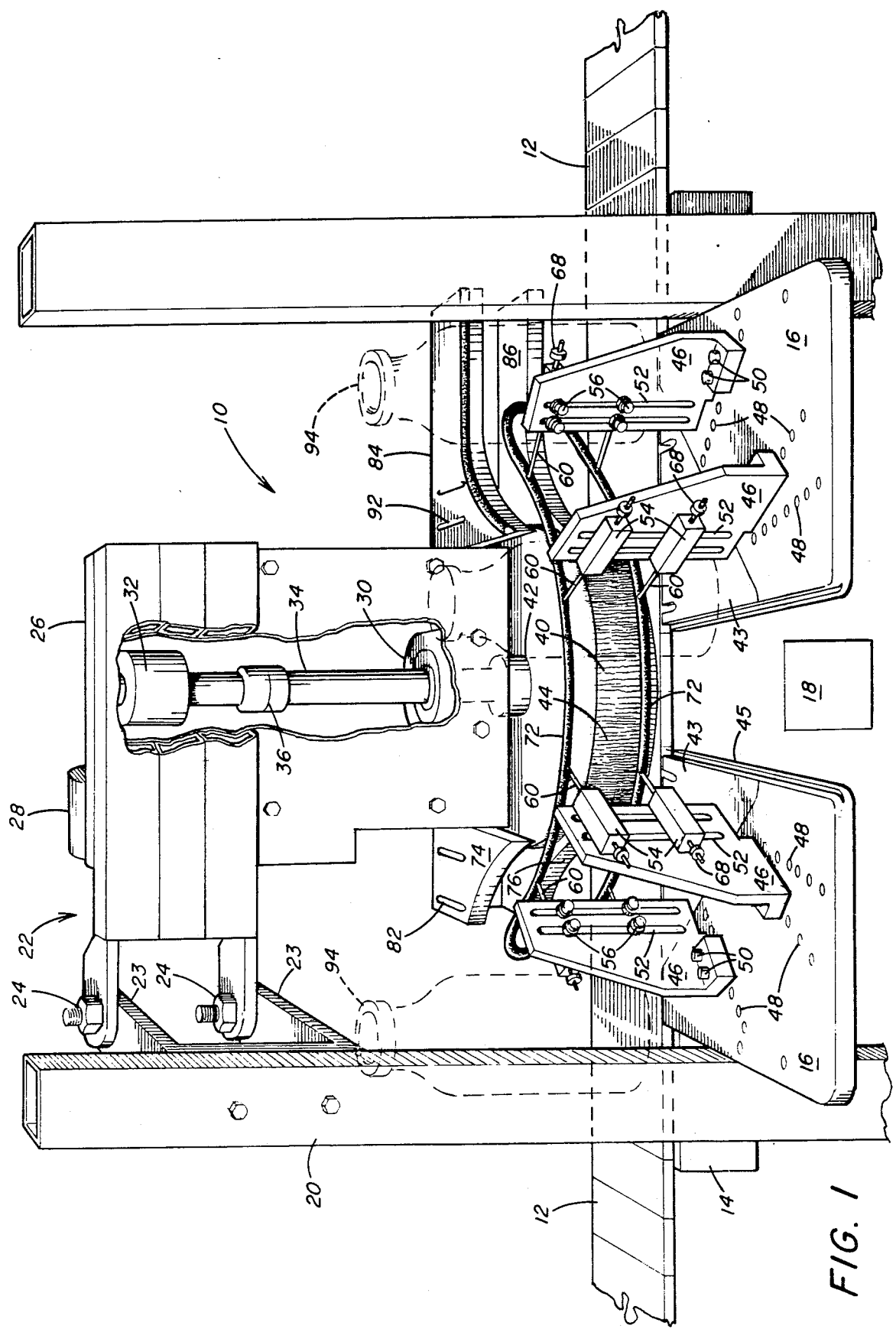
FIG. 1 is a perspective view of the container handling device of the present invention with a portion of the motor baseplate cut away to show features of the invention.

Referring to the drawings, and particularly to FIG. 1, there is shown a container handling device 10 positioned to remove containers from a linear conveyor path 12. The conveyor path 12 is formed by a conventional conveyor which is supported on a conveyor frame 2. The conveyor path 12 and frame are conventional and form no part of the present invention.

The container handling device 10 has a baseplate 16 which is positioned adjacent to the conveyor path 12 so that the top of the baseplate 16 and the top of the conveyor path 12 are substantially coplaner. The baseplate 16 is affixed by means of bolts (not shown) to a conveyor plate 14 that is bolted to the conveyor frame.

An off-line station 18 may be positioned beneath the baseplate 16 and may include for inspection operations a photoelectric system for scanning the bottom of a container or any number of other possible inspection systems, such as handling, filling, or rotating.

Positioned adjacent the baseplate 16 as shown in FIG. 1 is a mounting post 20 which is securely connected to the conveyor plate 14. A motor support structure 22 is pivotally secured to a pair of arms 23 extending from the mounting post 20 through a pair of pivot connections 24. The pivot connections 24 permit the motor support structure 22 to move through an arc of a preselected angle to either an operative or inoperative position as will be explained later in greater detail.

The motor support structure 22 includes a motor mounting plate 26 which is shown in a partial cut-away condition in FIG. 1. Affixed to the motor mounting plate 26 is a drive motor 28 which is preferably an electric gear motor. Also affixed to motor mounting plate 26 is a pillow block 30 for maintaining axial alignment of a shaft 34. A speed reduction gear 32 is positioned on the drive output of motor 28 and secured to shaft 34 so that shaft 34 is driven by motor 28. A shaft coupling 36 couples shaft 34 to speed reduction gear 32.

A drive wheel 40 is connected to shaft 34 by hub connector 42 and is driven by shaft 34. The hub connector 42 is of conventional design and permits the wheel 40 to be adjusted vertically on shaft 34. The perimeter of wheel 40 has an outer face to which is secured a urethane belting 44. As will be explained later in greater detail the belting 44 supports a container as it is conveyed through the off-line conveyor station 18.

As seen in FIG. 1, the baseplate 16 is connected to the conveyor frame by the conveyor plate 14 and connected to the baseplate 16 are a pair of wear plates 43. The wear plates 43 are flush with the conveying path of the in-line conveyor station.

Figure 3:
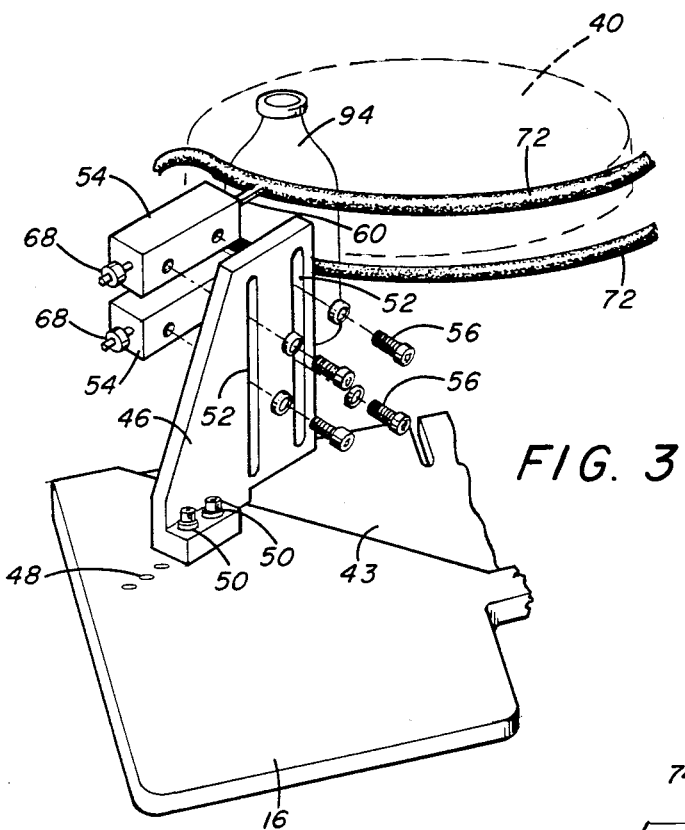
FIG. 3 is a perspective view showing details of the baseplate and the plunger unit supporting members.
Figure 5:
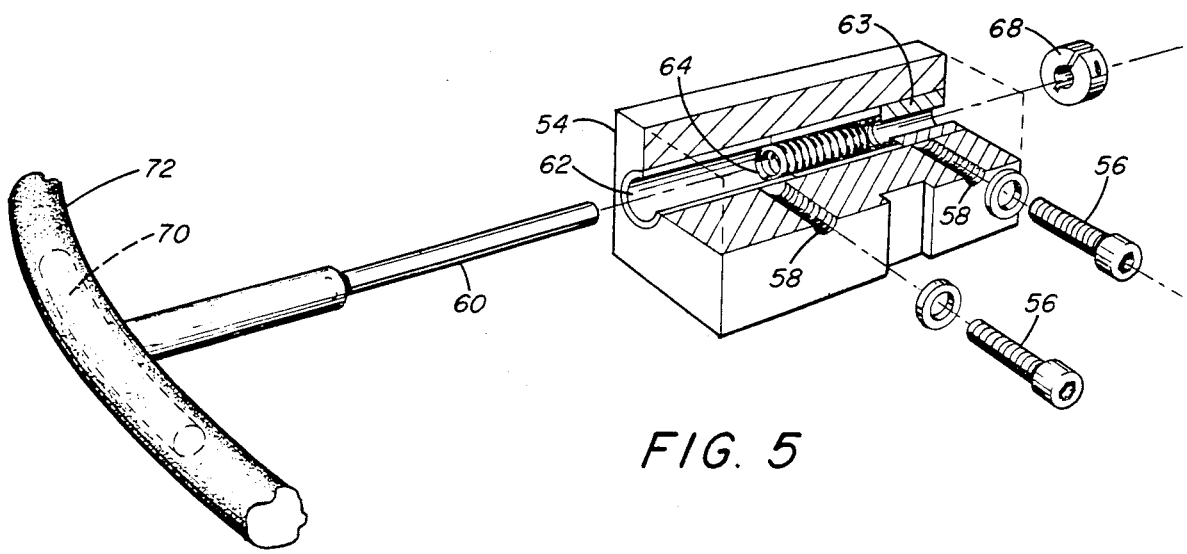
FIG. 5 is an exploded view showing the plunger unit of the present invention.

Plunger support members 46 shown in FIGS. 1, 3 and 5 are secured to baseplate 16 by means of bolts 50 inserted into holes 48 formed in the baseplate 16. There are a plurality of holes 48 formed in the baseplate so that the position of plunger support members 46 may be adjusted relative to the center of the drive wheel 44 for adjusting the support band pressure on the container.

Two plunger units 54 are secured to each support member 46 by means of bolts 56 inserted through slotted holes 52 formed in the support members 46. With this arrangement the height of support bands 72 is adjusted. This height is the distance from the baseplate 16 to the center of plunger 60 on the opposite end of support band 72. The plunger units 54 have tapped holes 58 (FIG. 5) to receive the bolts 56.

As shown in detail in FIG. 5 each plunger unit 54 has a plunger 60 retained within bushings 62 and 63 which are press fit in the plunger unit. A coil spring 64 forces the plunger 60 outwardly from the plunger unit 54. The plunger is restrained by a collar 68 which is attached to the end of plunger 60. The plunger 60 has a support band connector 70 formed on the end thereof.

As is shown in FIGS. 1 and 3, a support band 72 in the form for example of flexible tubing is attached to the tubing connector 70 of each plunger 60. The support band 72 is moved away from the plunger unit 54 by the coil spring 64. The plunger units 54 are positioned so that the longitudinal axis of the plungers 60 pass through the center of the drive wheel 40. The slotted holes 52 in each plunger support member 46 and are parallel positioned. This arrangement permits the plungers 60 to be adjusted vertically with respect to the center of the drive wheel 40.

Figure 2:
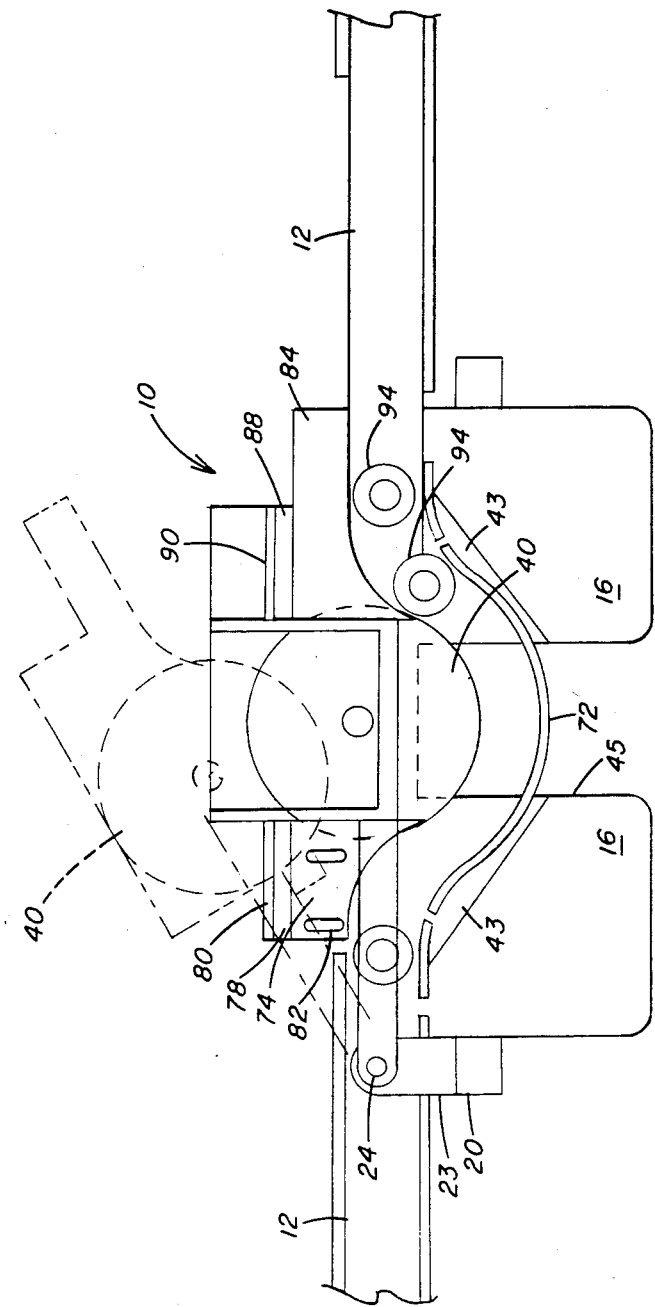
FIG. 2 is a top plan view of the device of the present invention showing in phantom the rotating wheel and its drive unit in the inoperative position.
Figure 4:
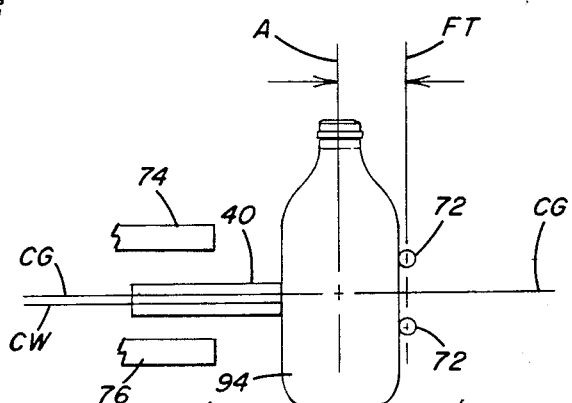
FIG. 4 is a diagrammatic view showing the container positioned relative to the wheel and the flexible tubing of the present invention.

As is shown in FIGS. 1, 2, and 4 an upper infeed guide 74 is positioned above wheel 40 and a lower infeed guide 76 is positioned below wheel 40. The infeed guides 74 and 76 are attached to a guide mount 78. The guide mount 78 is fastened to a guide plate 80 that is attached to the motor mounting plate 26.

Slotted holes 82 are provided in the infeed guides 74 and 76 so that they may be bolted to the guide mount 78 and may be adjusted horizontally relative to the guide mount 78. Similarly, slotted holes are formed in the guide plate 80 for attaching guide plate 80 to the motor mounting 26 so that both infeed guides 74 and 76 may be adjusted vertically relative to the motor mounting plate 26.

In a similar fashion, upper outfeed guide 84 and lower outfeed guide 86 are mounted onto guide mount 88 which is, in turn, fixed to guide plate 90. The slotted holes 92 permit horizontal adjustment of the outfeed guides 84 and 86. In similar fashion vertical adjustment of outfeed guides 84 and 86 is provided by slotted holes in the guide plate 90.

Containers 94 move along the conveyor 12, until they contact the infeed guides 74 and 76 of the conveyor handling device of the present invention. The containers 94 are then contacted by the face 44 of wheel 40 and by the flexible support bands 72 so that the containers 94 are rolled between the wheel 40 and the support bands 72 off the conveyor 12 and onto the wear plate 43. The containers are moved over the pocket or opening 45 between the wear plates 43. The containers 94 are securely engaged by the wheel 40 and bands 72 as the containers are advanced along the off-line conveyor. The containers 94 are supported by the wear plates 43 as they move to and from the off-line station 18. However, when moved to the station 18 by rotation of the wheel 40, the containers remain captured between the wheel 40 and bands 72 so that it is not necessary to support the bottom of the respective containers 94.

The containers continue to be moved about the periphery of wheel 40, between wheel 40 and support bands 72 until they contact outfeed guides 84 and 86. The outfeed guides 84 and 86 assist in aligning and stabilizing the containers 94 with respect to the conveyor 12 so that they are centered on conveyor 12 as they continue downstream of the off-line station 18.

FIG. 4 schematically illustrates an example of the present invention, showing drive wheel 40 gripping a container 94, the support bands 72, and the infeed guides 74 and 76. The drive wheel 40 is positioned vertically slightly below the center of gravity CG of container 40. In one embodiment of the present invention the centerline CW of drive wheel 40 is approximately ¼ inch to ⅜ of an inch below the center of gravity CG. The support bands 72 are positioned vertically so that the upper and lower bands 72 are each an equal distance from the center of gravity CG of the container 94.

The upper and lower support bands 72 must also be positioned vertically one above the other on line FT at the same distance from the axes A of the container 94. If the support bands 72 are not positioned one above the other at the same distance from the axis A of container 94, the container 94 will not roll uniformly between the drive wheel 40 and flexible support bands 72, but will cant relative to the wheel 40.

The support bands 72 are held in place by the spring-loaded plungers 60. The plunger units 54 are adjusted vertically by loosening bolts 56 on the plunger support members 46. Rough adjustment of the support band pressure is made by setting the container 94 against the drive wheel 40 and positioning the support bands 72 close to the container. The support members 46 are then located in the desired position on baseplate 16 by tightening bolts 50 in the selected holes 48 of baseplate 16. Bolts 50 are tight enough to hold the support members 46 in place but loose enough to allow fine adjustment.

The fine compression adjustment is made by the plunger units 54 on the pair of the middle support members 46. The plungers 60 are slid into position against the container 94. The plungers 60 are in line with the center of the drive wheel. Each bolt 50 is then tightened.

The plunger units 54 positioned adjacent to the infeed and outfeed of the off-line station 18 are fine adjusted so that the respective plungers 60 exert enough pressure to grip container 94 to drive it into and out of the off-line station 18 without slippage occurring. Adjusting collar 68 completes the fine adjustment. This adjustment to the infeed and outfeed plungers 60 can be made when the off-line station 18 is operating.

Because of the adjustability of the wheel 40 vertically relative to the plungers 60, various sizes and shapes of containers may be accommodated without extensive exchange of parts or downtime. Likewise, the adjustability of plunger units 54 both vertically and horizontally relative to base plate 16 through the use of the multiplicity of holes 48 in base plate 16 to provide horizontal adjustability and through the use of slotted holes 52 in the plunger support members 46 to provide vertical adjustability, permits various sizes and shapes of containers to be accommodated.

The plunger units 54 urge the flexible support bands 72 toward the rotating wheel 40. The plunger units 54 are positioned to accommodate the particular size and shape of container that is being carried by conveyor 12. The support bands 72 snugly grip the container 94 so that container 94 is engaged by the face 44 of wheel 40 and by the support bands 72.

As shown in FIG. 2, the wheel 40, the motor 28, and the motor support structure 22 may be pivoted either manually or automatically about mounting post 20 to the position shown in phantom lines so that the container handling device 10 of the present invention is out of the way and does not affect containers moving on the in-line conveyor 12. When the container handling device 10 is moved into position as shown in the solid lines on FIG. 2, containers 94 moving along the in-line conveyor 12 contact the container handling device 10 and are moved onto the wear plate 43.

The speed of motor 28 is adjustable in conventional fashion so that the speed of wheel 40, as it rotates, may be adjusted to rotate wheel 40 to drive the container 94 at the same linear velocity as the linear velocity of in-line conveyor 12.

Because the face 44 of the wheel 40 and flexible support bands 72 grip the containers 94, the containers 94 do not have to be uniformly spaced on the conveyor 12, nor does the functioning of the container handling device of the present invention depend upon precisely timed movement of the wheel 40 relative to the position of the containers 94. In this respect the container handling device does not have to be synchronized with the in-line conveyor 12, in fact it can be described as being asynchronous with respect to the conveyor 12.

In operation the container handling device is utilized with a proximity detector (not shown) for tracking a container through the off-line conveyor 18. Also an encoder is used to generate drive belt pulses which are counted to control, for example, an optical sensor positioned beneath the pocket 45 between the wear plates 43. When the moving container is in the desired position in the off-line station 18, the optical sensor is actuated.

According to the provisions the patent statutes, we have explained the principal, preferred construction and mode of operation of our invention and have illustrated and described what we now consider to represent its best embodiments. However, it should be understood that, within the scope of the appended claims, the invention may be practiced otherwise than as specifically illustrated and described.

We claim:

1. A container handling device for controlling the movement of individual containers from a linear conveyor to an off-line station where an inspecting operation is performed and thereafter returning said containers to said conveyor comprising,
    a frame carrying said conveyor,
    a base plate affixed to said frame and positioned so that the top of said base plate is substantially coplanar with the top of said conveyor and positioned over said off-line station,
    a rotating wheel having a face on the periphery thereof, said rotating wheel positioned above said conveyor and said base plate so that containers moving along said conveyor contact the face of said wheel, guide means positioned adjacent said rotating wheel for moving said containers off said conveyor and onto said base plate and then back onto said conveyor as said wheel rotates, flexible retaining means positioned in spaced relation to said rotating wheel for contacting containers so that containers are frictionally engaged between said wheel face and said flexible retaining means to advance containers through said off-line station upon rotation of said wheel, said containers being solely vertically supported by the frictional engagement between said wheel face and said flexible retaining means during the portion of said movement over said off-line station, and said containers rotating about their central vertical axis during the movement off of said conveyor due to the frictional engagement with said wheel face and said flexible retaining means.

2. A container handling device as set forth in claim 1 wherein, said rotating wheel is driven by a motor, and said wheel and said motor both being suspended above said conveyor by a structure attached to said conveyor frame.

3. A container handling device as set forth in claim 1 which includes, said rotating wheel being selectively pivoted away from above said conveyor and said base plate so that said conveyor may operate without containers being diverted to said off-line station.

4. A container handling device as set forth in claim 1 wherein, said rotating wheel is adjustable relative to said conveyor so that the height between the top of said conveyor and said rotating wheel may be selectively varied.

5. A container handling device as set forth in claim 1 which includes, said flexible retaining means including a plurality of flexible support bands, and a plurality of spring-loaded plunger units adjustably secured to said base plate for biasing said flexible support bands toward the center of said rotating wheel.

6. A container handling device as set forth in claim 1 wherein, the face of said rotating wheel is timed to move at a linear speed with respect to said conveyor so that said containers are smoothly removed from said conveyor and replaced thereon.

7. A container handling device as set forth in claim 1 wherein, said flexible retaining means is adjustable vertically relative to the top of said conveyor and relative to said rotating wheel so that said flexible retaining means guides said containers in an upright position over said base plate.

8. A container handling device as set forth in claim 5 wherein, said rotating wheel has a urethane strip around its periphery so that said container is gripped and rotated between said rotating wheel and said flexible support bands as said container is removed from said conveyor.

9. A container handling device for diverting individual containers from a linear conveyor to an off-line station where an inspecting operation is performed and thereafter returning said containers to said conveyor downstream from said off-line station comprising, a conveyor support frame, a base plate affixed to said support frame so that the top of said base plate is substantially co-planar with the top of said conveyor and positioned over said off-line station, a drive motor, a motor support structure secured to said conveyor support frame for supporting said motor for pivotal movement between an operative position above said conveyor and an inoperative position to one side of said conveyor, said motor support structure in said operative position extending across said conveyor to divert said containers from said conveyor above said base plate and back to said conveyor, said motor support structure in said inoperative position pivoted away from said conveyor to permit said containers to advance on said conveyor past said off-line station, a vertical rotatable shaft supported in said motor support structure and driven by said motor, a wheel mounted on said shaft for rotation with said shaft, said wheel having a peripheral face, said wheel being adjustably positioned on said shaft so that the vertical distance between the center of said wheel and the top of said conveyor may be changed in accordance with the size and shape of the containers carried on said conveyor, two sections of flexible tubing, a plurality of spring loaded plunger units supporting said flexible tubing, said plunger units being adjustable horizontally and vertically relative to said baseplate to permit said flexible tubing to be selectively positioned relative to said wheel, and said flexible tubing and said plunger units cooperating to bias said flexible tubing toward the center of said wheel so that said containers are frictionally engaged between said wheel face and said flexible tubing to move said containers from said conveyor, over said base plate and then back onto said conveyor as said wheel rotates, said containers being solely vertically supported by the frictional engagement between said wheel face and said flexible retaining means during the portion of said movement over said off-line station, and said containers rotating about their central vertical axis during the movement off of said conveyor due to the frictional engagement with said wheel face and said flexible retaining means.

10. A container handling device as set forth in claim 9 wherein, one of said sections of flexible tubing is positioned vertically from said base plate in a position above said wheel and the other of said sections of flexible tubing is positioned vertically from said base plate in a position below said wheel.

11. A container handling device as set forth in claim 9 wherein, said motor is an electric gear motor.

12. A container handling device as set forth in claim 9 which includes, infeed guides for guiding said containers on said conveyor into contact with said wheel, and outfeed guides for diverting said containers from said base plate back onto said conveyor after said containers leave said base plate.

13. A container handling device as set forth in claim 9 wherein, said base plate contains a series of holes wherein said plunger units are selectively bolted to provide for in-line adjustment of said plunger units on said base plate with respect to the center of said wheel.

14. A container handling device as set forth in claim 9 wherein, said plunger units include vertical slots to provide vertical adjustment of said plungers maintained in-line with the center of said wheel.

15. A container handling device as set forth in claim 9 wherein, said base plate contains one or more openings through which said off-line station is made accessible to said containers.

16. A method of diverting individual containers from a linear conveyor to an off-line station where an inspecting operation is performed and thereafter returning said containers to said conveyor downstream from said off-line station comprising the steps of, positioning a base plate so that the top of said base plate is substantially co-planar with the top of said conveyor and over said off-line station, positioning a rotating wheel above said conveyor and said base plate whereby said containers contact the edge of said rotating wheel as they move along said conveyor, positioning flexible retaining means in spaced relation to said rotating wheel, engaging containers between said wheel edge and said flexible retaining means, and rotating said wheel to roll containers on said wheel edge to move said containers off said conveyor and onto said base plate, over said off-line station, and then back onto said conveyor, said containers being solely vertically supported by the frictional engagement between said wheel face and said flexible retaining means during the portion of said movement over said off-line station, and said containers rotating about their central vertical axis during the movement off of said conveyor due to the frictional engagement with said wheel face and said flexible retaining means.

17. A method as set forth in claim 16 including, positioning said rotating wheel at a specified distance above said conveyor to accommodate the particular size and shape of container on said conveyor.

18. A method as set forth in claim 16 including, positioning said flexible retaining means relative to said wheel to accommodate the particular size and shape of container on said conveyor.

19. A method as set forth in claim 16 including, rotating said wheel at a speed such that the circumference of said wheel moves at twice linear speed as said conveyor to maintain continuous linear movement of said containers.

* * * * *